United States Patent [19]

Jurgena

[11] Patent Number: 5,088,561
[45] Date of Patent: Feb. 18, 1992

[54] SENSING APPARATUS FOR A GUIDANCE SYSTEM

[75] Inventor: Larry F. Jurgena, Hampton, Iowa

[73] Assignee: Sukup Manufacturing Company, Sheffield, Iowa

[21] Appl. No.: 608,252

[22] Filed: Nov. 2, 1990

[51] Int. Cl.[5] .............................................. A01B 69/00
[52] U.S. Cl. ..................... 172/5; 104/244.1; 172/26; 180/131
[58] Field of Search ................ 172/5, 6, 26; 180/131, 180/79; 280/776; 104/244.1; 171/9; 56/10.2

[56] References Cited

U.S. PATENT DOCUMENTS

| 2,881,712 | 4/1959 | Murphrey . | |
|---|---|---|---|
| 3,611,286 | 10/1971 | Cleveland | 280/776 X |
| 4,414,903 | 11/1983 | Fasse et al. | 172/5 X |

FOREIGN PATENT DOCUMENTS

| 672646 | 10/1963 | Canada | 172/5 |
|---|---|---|---|
| 3637186 | 5/1988 | Fed. Rep. of Germany | 172/6 |

OTHER PUBLICATIONS

Lincoln Creek Mfg., "The Guide: Owner's Guide and Parts List", Feb. 1989.
Navigator Row Crop Guidance System Operator's Manual and Parts Guide, H R Manufacturing Co.
Navigator Row Crop Guidance System advertising brochure entitled, "#1 in Row Crop Guidance", H R Manufacturing Co.

Primary Examiner—Randolph A. Reese
Assistant Examiner—Jeffrey L. Thompson
Attorney, Agent, or Firm—Leydig, Voit & Mayer

[57] ABSTRACT

An agricultural implement guidance system having a sensing apparatus and sensing apparatus brackets. The sensing apparatus brackets have an offset configuration so that the brackets form a V-shape when the brackets are attached to the support rod. The sensing apparatus is attached to the lower portion of the brackets and is a flexible material which will follow the valley between the ridges or a furrow created by a row marker on a planter.

19 Claims, 4 Drawing Sheets

SENSING APPARATUS FOR A GUIDANCE SYSTEM

BACKGROUND OF THE INVENTION

This invention relates to a guidance system for agricultural equipment and more particularly to a sensing apparatus for the guidance system.

Various agricultural machines utilize plant sensing wands mounted on the machine for sensing the position of the standing plants for various purposes. Typically, this sensing is for guidance purposes to provide a feedback signal to a machine guidance or positioning mechanism to assure proper positioning of the machine relative to a row of such plants. By way of example, such sensors and guidance systems may be utilized on cultivating equipment.

The sensing wands are affixed to a rotatable shaft. The shaft and wand may be biased to a predetermined angular position. As the wands contact the crop, its angular position is adjusted whereby the angular position of the shaft reflects the sensed position of the crop relative to the machine.

The adjustment of the angular position provides an electronic signal to the guidance control system which provides output for corrective action to the guidance mechanism. The guidance mechanism will adjust the movement of the implement or its relative components to affect lateral adjustment thereof and thereby also will move the sensing wands relative to the crops.

However, these guidance systems are limited because the sensing assembly requires a standing row of plants to provide a reference for the wand sensors. It would be advantageous if the farmer could use the guidance system to perform an agricultural procedure when the field does not have standing rows of plants. For example, it would be advantageous if the farmer could use the guidance system during the planting process. By using a guidance system during the planting process, the guidance system would assure that each set of rows would be straight and parallel to the adjacent set of rows to prevent the crowding of the crop rows. By preventing the crowding of crop rows, the farmer will be able to achieve higher crop yields and reduce damage or loss to the crop during the cultivating and harvesting processes. Therefore, there is a need for a guidance system which can be used when the field does not have standing rows of plants.

In addition, there are other devices which follow a valley or a marker furrow and these devices do not require a standing row of plants. However, these devices accumulate or plug with crop residues. Specifically, the crop residues become engaged on portions of the device. The crop residues which accumulate on the device cause the device to be lifted or raised from the valley or marker row. Consequently, the device is not able to properly perform its guidance function. Therefore, there is a need for a guidance system which will not accumulate or plug with crop residues. The present invention is less likely to accumulate or plug with crop residues as compared with the other devices. Furthermore, these devices utilize several components and are expensive to manufacture. The present invention is rugged, utilizes a minimum number of components and is economical to manufacture.

SUMMARY OF THE INVENTION

In the present invention the aforementioned problem is solved by using a very simple sensing apparatus which senses the contour or previously established reference indicia in the field.

The sensing assembly is mounted to the agricultural implement by a bracket assembly which extends in front of the implement and provides orthogonal, vertical and horizontal positioning adjustment of the sensor assembly. A support bracket for the position sensor is attached to the lower end of the vertical bracket and supports the position sensor mechanism. The latter mechanism includes a fixed housing, a pivotable support for the sensing apparatus and a sensor for responding to the relative angular position of the pivotable support relative to the housing.

The sensor includes a vertical shaft which extends downward and is attached to the bracket assembly. The bracket assembly contains a U-shaped bracket which has one hole on each leg of the bracket. A support rod can be inserted into these holes. The bracket assembly provides a support structure for the sensing apparatus brackets and the sensing apparatus. The sensing apparatus brackets are attached to each end of the support rod. The brackets have an offset configuration so that the brackets form a V-shape when the brackets are attached to the support rod. The sensing apparatus is attached to the lower portion of the brackets and is a weighty, freely flexible member, such as a heavy link chain, throughout its length to readily follow the valley between the ridges or a furrow created by a row marker on a planter. In one particular embodiment, the sensing apparatus is a length of chain.

A collar is attached to the upper end of the shaft which is located inside the fixed sensor housing, and affixed to the collar is a photoelectric light source. The light source projects a beam of light at a pair of photoelectric sensors which are mounted inside the housing. In the zero or null calibration setting the beam of light should shine between the photoelectric sensors.

When the sensing apparatus is displaced, the shaft is rotated in the corresponding direction and activates the respective photoelectric sensor. The photoelectric sensor provides an electronic signal to the guidance control system which provides output for corrective action to the guidance mechanism. The guidance mechanism will adjust the movement of the implement or its relevant components to effect lateral adjustment thereof and thereby also will move the sensing apparatus relative to the crops. The movement of the apparatus will eventually project the beam of light to the null calibration setting which is between the photoelectric sensors.

One object of this invention is to provide an improved sensing apparatus for a guidance system.

A further object of this invention is to provide a sensing apparatus which will allow the use of a guidance system during the planting process.

An additional object of this invention is to provide an improved sensing apparatus which is compatible with existing guidance systems.

Another object of this invention is to provide a sensing apparatus which is rugged, highly reliable, uses a minimum of component parts and is economical to manufacture.

BRIEF DESCRIPTION OF THE DRAWINGS

Other objects and advantages of the invention will become apparent upon reading the following detailed description and appended claims, and upon reference to the accompanying drawings, in which:

It should be understood that the drawings are not necessarily to scale and that an embodiment is sometimes illustrated in part by schematic and fragmentary views. It should be understood, of course, that the invention is not necessarily limited to the particular embodiments illustrated herein.

DESCRIPTION OF THE PREFERRED EMBODIMENT

Figures 1, 2:
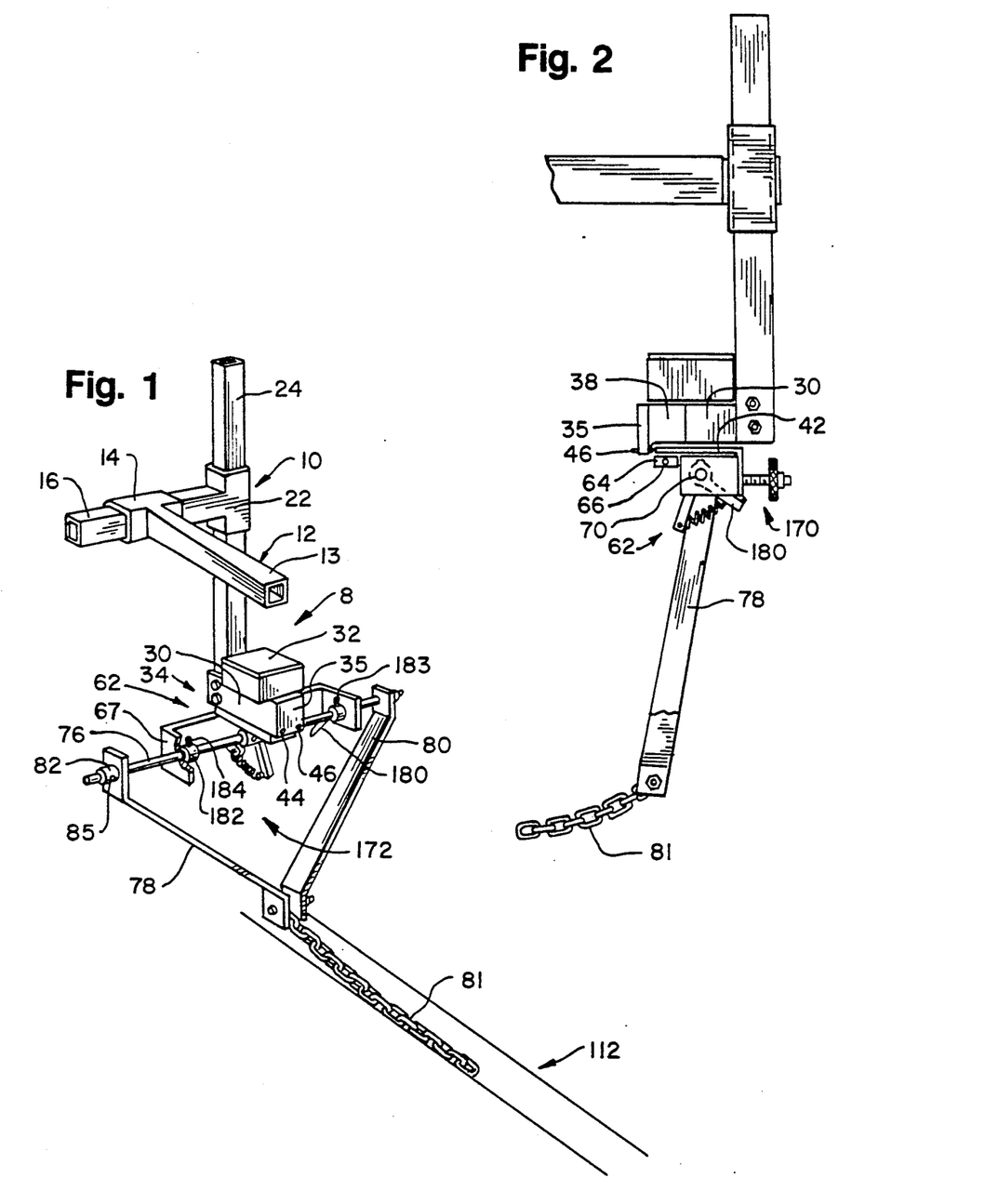
FIG. 1 is a rear perspective view of the position sensing assembly which shows the sensing apparatus engaging a planter marker furrow.
FIG. 2 is side elevational view of the position sensing assembly. The wand position sensing assembly is shown with one of the sensing apparatus brackets partially cut away.

Referring to FIG. 1, the position sensing assembly 8 is supported by a bracket assembly 10 which is fixedly mounted on an appropriate frame element of an agricultural implement. The implement is not otherwise illustrated. It will be appreciated that the implement may be a row-crop planter or any other implement where accurate lateral positioning of the implement relative to rows of plants, ridges or other guidance references is important to the desired or optimum utilization and operation of the implement. As is known in this art, the purpose of the position sensing assembly is to provide an output control signal corresponding to the instantaneous lateral position of the implement relative to the row reference. That control signal is derived from the position of the sensing apparatus relative to the mechanism on which it is mounted. The control signal indicates the relative rotational position of the sensing apparatus in a horizontal plane as the sensing apparatus follows the row reference indicia. The control signal also indicates the relative rotational position of the sensing apparatus as the implement frame shifts back and forth laterally of the rows due to variations in the guidance of the implement, field conditions, or the like.

The output control signal from the position sensing assembly typically serves as an input to an appropriate indicator or power control mechanism for assisting in or affecting the lateral positioning of the implement to an optimum operational position relative to the row reference. For example, the output may drive a visible indicator observed by the operator of the implement or a towing tractor for appropriate corrective manual guidance to seek the optimum positioning of the implement. Alternatively, the output may be used as an input to an automatic power guidance mechanism for affecting automatic lateral adjustment of the implement relative to the sensed row reference or rows of crop plants. One type of guidance mechanism is shown in U.S. Pat. application Ser. No. 07/424,701 which was filed on Oct. 20, 1989. However, there are many types of guidance mechanisms which are well known in the art.

The bracket assembly 10 provides orthogonal vertical and horizontal adjustable support for the sensor assembly 8 and includes a first horizontal bracket 12 which is affixed to the implement frame (not shown). The bracket 12 includes a laterally extending holder sleeve 14 at the forward end of support arm 13. The sleeve 14 accepts another horizontal bracket arm 16. The horizontal bracket arm 16 slides laterally within the sleeve 14 to permit lateral adjustment of the sensing assembly 8 and is held in a selected position by set screws (not shown). A vertical sleeve 22 is attached to the end of the horizontal bracket arm 16. The sleeve 22 accepts a vertical bracket arm 24. The vertical bracket arm 24 slides within the sleeve 22 to permit vertical adjustment of the sensing assembly 8 and is held in a selected position by set screws (not shown).

Figures 3, 4:
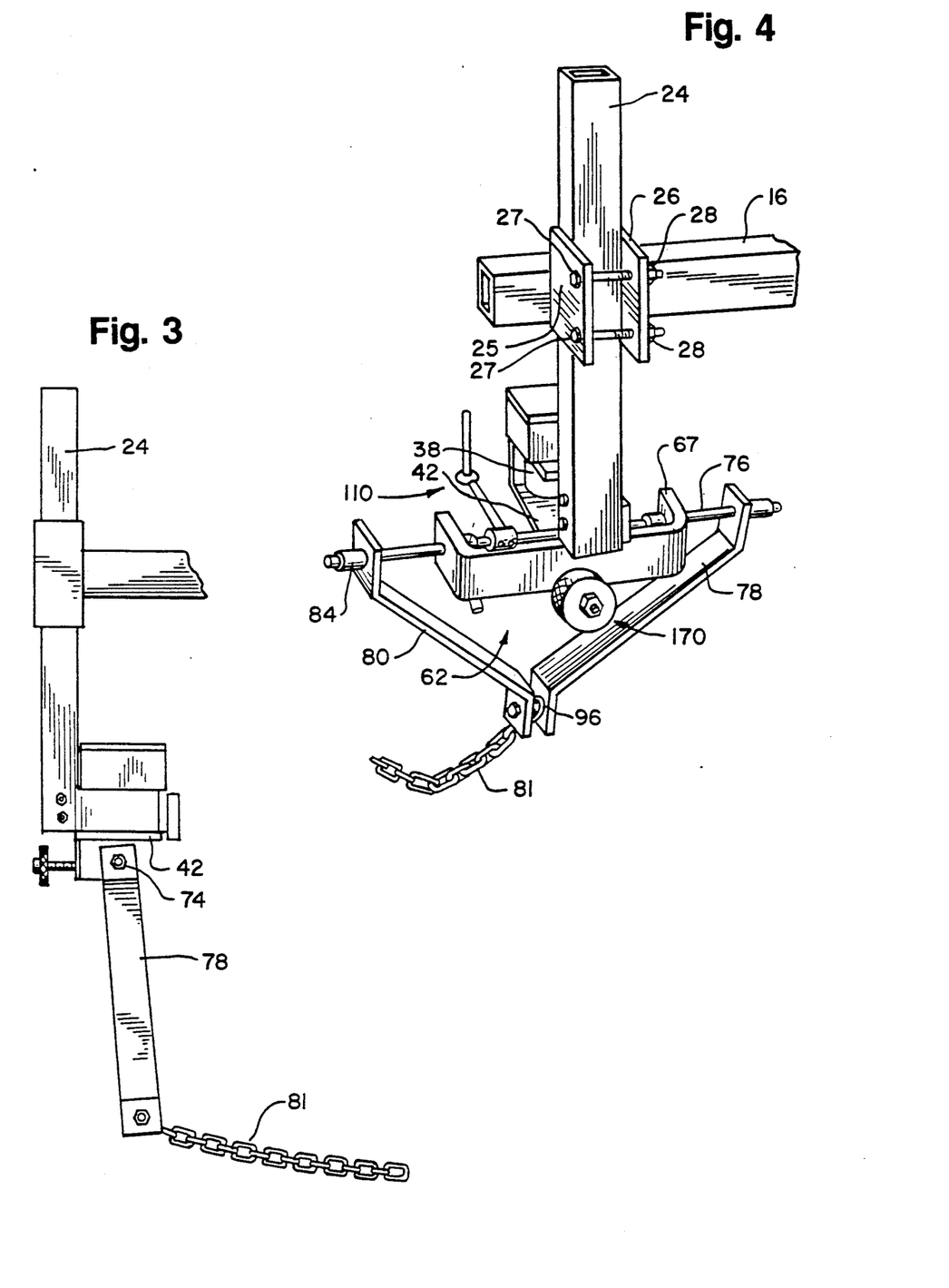
FIG. 3 is another side elevational view of the position sensing assembly of FIG. 1.
FIG. 4 is a perspective view of the position sensing assembly.

Another method of permitting adjustment of the bracket arms 12, 16 and 24 is the use of squeeze plates 25 and 26 as shown in FIG. 4. The squeeze plates 25 and 26 are welded or attached to the bracket arm 16. The bracket arm 24 is positioned between the squeeze plates 25 and 26 and bolts 27 are inserted into holes or apertures in the squeeze plates. Finally, nuts 28 are threaded onto the ends of the bolts 27. The vertical bracket arm 24 slides between the squeeze plates 25 and 26 to permit vertical adjustment of the sensing assembly 8 and is held in a selected position by tightening the bolts 27 and nuts 28. Of course, these squeeze plates can be substituted for sleeve 14.

The position sensing assembly 8 includes a support bracket 30 and housing 32 and a pivoting assembly 34 which is pivotably supported therefrom. The housing is mounted on the bracket 30, as by screws and the bracket 30 is affixed to the lower portion of the arm 24 whereby the housing 32 remains in fixed position relative to the bracket assembly 10 and hence relative to the implement. The bracket 30 is generally L-shaped in cross section and has a front plate 35. A vertical bearing sleeve 38 also is affixed to the bracket 30 and/or to the housing 32 for rotatably supporting the pivoting assembly 34.

Figure 6:
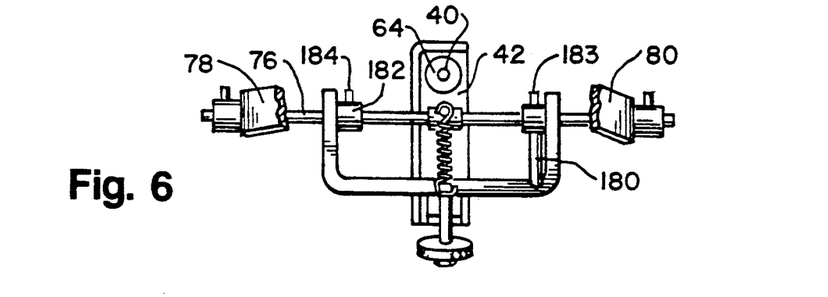
FIG. 6 is a sectional bottom view of the position sensing assembly of FIG. 5 along line 6—6.

The pivoting assembly 34 includes a vertical shaft 40 (see FIGS. 6 and 7) which extends downward into sleeve 38. Appropriate bearings, not shown, rotatably support the shaft 40 in the sleeve 38 and thereby pivotably support the assembly 34. The shaft 40 extends beyond the sleeve 38 and is attached to the top plate 42 of a bracket assembly 62. The axis of shaft 40 defines a generally vertical pivot axis which permits horizontal pivotal movement of the bracket assembly 62. Specifically, the bracket assembly 62 includes a collar 64 which is welded or affixed to the underside of plate 42 and the collar 64 has two holes which accept a roll pin 66. The collar 64 is positioned around the shaft 40 and is connected to the shaft by the roll pin 66.

The front plate 35 of support bracket 30 extends downward and in front of top plate 42. The front plate 35 has stops 44 and 46 which extend through the front plate 35 toward the front of top plate 42. The bracket assembly 62 can rotate approximately four degrees from the center position before the front of top plate 42 contacts one of the stops 44 or 46. This arrangement prevents the bracket assembly 62 from rotating more than eight degrees so that the sensing apparatus is maintained in the proper general orientation.

The bracket assembly 62 also includes a U-shaped rod support 67 which has holes 70 and 74 on each leg of the bracket. (See FIGS. 2 and 3). A support rod 76 is inserted into the holes 70 and 74. The bracket assembly 62 provides a support structure for the sensing element brackets 78 and 80 to which the sensing element 81 is attached. The brackets 78 and 80 are attached to each end of support rod 76. Specifically, the collars 82 and 84 are welded or otherwise affixed to the upper ends of the brackets 78 and 80, respectively. The collars 82 and 84 are positioned onto each end of the support rod 76. The brackets 78 and 80 are attached to the support rod 76 by set screws 85 in the collars 82 and 84. The set screws are loosened to adjust the position of the brackets and tightened when the brackets are in the desired position.

Figure 5:
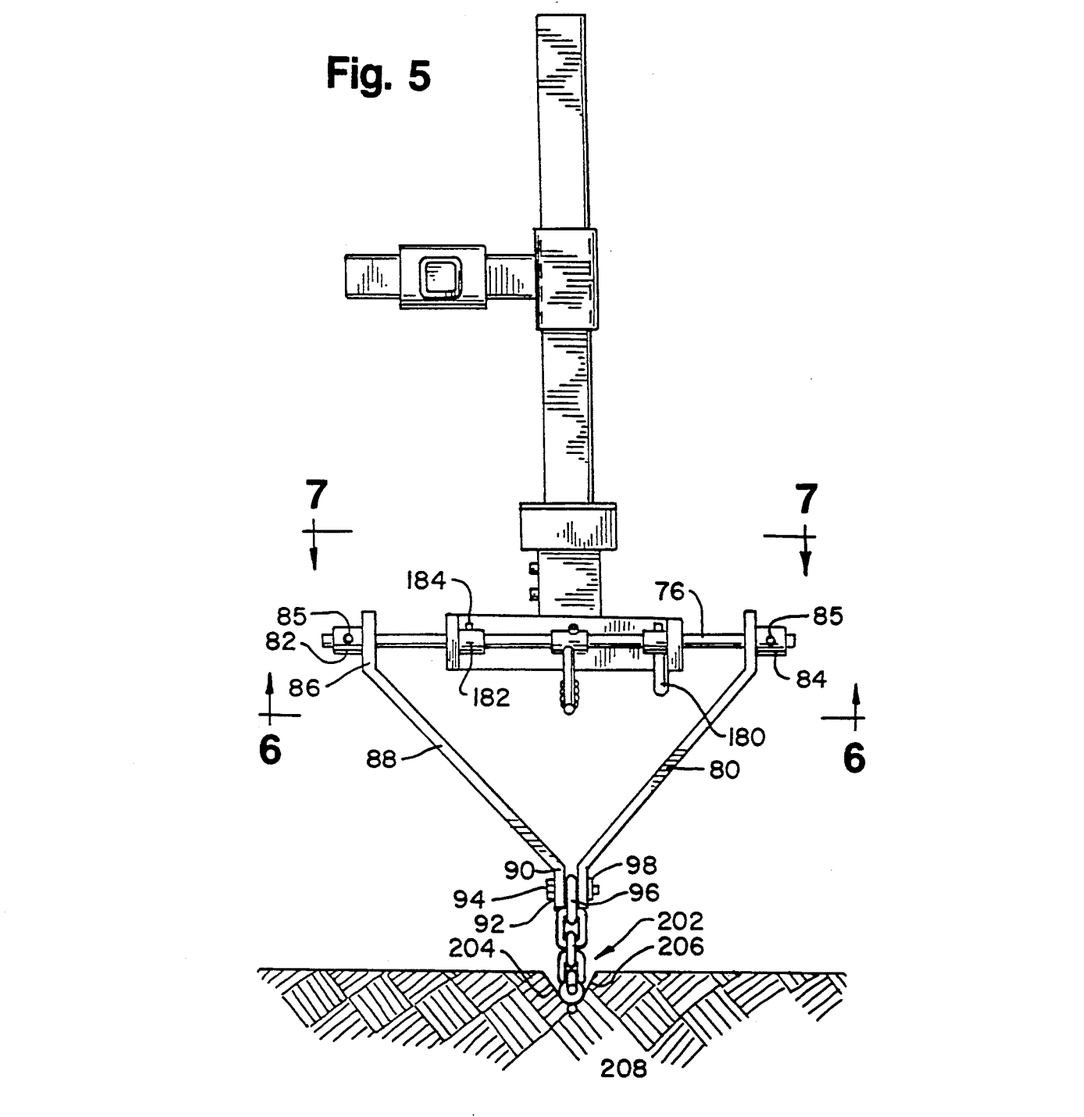
FIG. 5 is a rear elevational view of the position sensing assembly which shows the sensing apparatus engaging a planter marker furrow.

Referring to FIG. 5, the brackets 78 and 80 have an offset configuration so that the brackets form a V-shape when the brackets are attached to the support rod 76. Since the configuration of the brackets 78 and 80 is similar, it is only necessary to describe the configuration of bracket 78. The bracket 78 includes an upper portion 86, a center portion 88 and a lower portion 90. The center portion 88 is offset or at an angle from the upper portion. In one particular embodiment, the angle between the upper portion 86 and the center portion 88 is approximately 240 degrees. The center portion 88 is offset or at an angle from the lower portion 90. In one particular embodiment, the angle between the center portion 88 and the lower portion 90 is approximately 150 degrees. The lower portion 90 of the bracket has an aperture 92 which accepts a bolt 94.

The sensing element 81 is attached to the lower portions 90 of the brackets and is a flexible material which will follow the valley between the ridges or a valley created by a row marker on a planter. In one particular embodiment, the sensing apparatus 81 is a length of chain which is attached to the lower portions 90 of brackets 78 and 80. The chain is approximately 36 inches in length and has 5/16 inch links. The leading link 96 of the chain is attached to the brackets 78 and 80 by inserting the bolt 94 into the apertures 92 and through the link 96. A nut 98 is threaded onto the end of the bolt 94.

Element 81 is a uniform elongate member which is freely flexible and uniformly weighted throughout this ground contacting length, preferably being a heavy link chain having links of uniform size and weight throughout its length from its attachment at the brackets 78,80 to its trailing distal end. Other possible elements include a series of small ball weights pivotally interconnected to one another in a series, as by interconnecting eyes at opposite ends of each ball, or metal beads strung on a freely flexible light metal cable, chain or line.

Referring to FIG. 4, a lift assembly 110 is used to raise and lower the brackets 78 and 80. The lift assembly 110 may be used when the operator turns the implement at the end of the field. By raising the brackets, the brackets and sensing apparatus will not be damaged by debris and other obstacles which can exist at the end of the field. The operation of the lift assembly 110 is described in the U.S. Pat. application Ser. No. 07/572,170 filed on Aug. 23, 1990.

Figure 7:
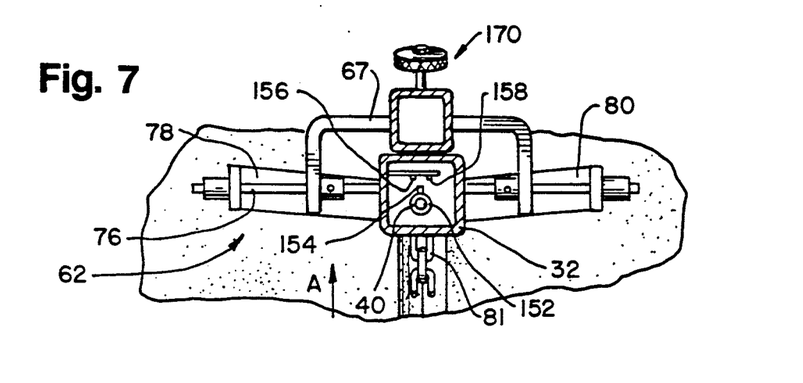
FIG. 7 is a sectional top plan view of the position sensing assembly of FIG. 5 along line 7—7.

Referring to FIG. 7, a collar 152 is attached to the upper end of the support pivot shaft 40, within housing 32, and affixed to the collar is a photoelectric light source 154. The light source 154 projects a narrow beam of light toward a pair of photoelectric sensors 156 and 158. The photoelectric sensor 158 represents the right displacement for the sensing apparatus 81 and the photoelectric sensor 156 represents the left displacement of the sensing apparatus 81. In the zero or null position of the sensing apparatus, the beam of light should shine between the photoelectric sensors 156 and 158. An adjustable assembly for the calibration of the guidance system and, more specifically, for the photoelectric sensors is shown in U.S. Pat. application Ser. No. 07/516,035 filed on Apr. 27, 1990.

When the position of the implement varies to the left (from the view if one were facing in the direction of arrow A) relative to the crop row being cultivated or otherwise treated, the trailing end of the sensing apparatus 81 is displaced to the right. The shaft 40 thereby is rotated in the corresponding direction and activates the photoelectric sensor 156. The photoelectric sensor 156 provides an electronic signal to the guidance controls (not shown). The guidance controls receive the signal and provide output for corrective action to the guidance indicator or mechanism which affects lateral adjustment of the implement. The guidance mechanism will then affect lateral adjustment of the implement which will move the sensing assembly 8 relative to the crops. The resulting relative movement of the sensing apparatus 81 will eventually project the beam of light to the null calibration setting which is between the photoelectric sensors 156 and 158.

Similarly, when the sensing apparatus is displaced to the left, the shaft 40 is rotated in the corresponding direction and activates the photoelectric sensor 158. The photoelectric sensor 158 provides an electrical signal to the guidance controls which provide corresponding output for corrective action.

Referring to FIGS. 1 and 4, the position sensing assembly 8 may include a side slope compensation assembly 170 to compensate for the adverse effects of operations on side slopes and a bracket down-force assembly 172 which applies a downward force on the brackets 78 and 80. The operation of the side slope compensation assembly 170 and the down-force assembly 172 are shown in the aforementioned U.S. Pat. application Ser. No. 07/516,035.

In addition, the sensing assembly 8 includes a stop arm 180 and a collar 182 which prevent the support rod 76 from excessive horizontal movement relative to U-shaped rod support 67. The stop arm 180 is positioned on the support rod 76 near one of the legs of the U-shaped rod support 67. The stop arm 180 includes a set screw 183 which is tightened to hold the stop arm in the desired position relative to the support rod 76. The collar 182 is positioned on the rod support 76 near the other leg of the U-shaped rod support 67. The collar 182 includes a set screw 184 which is tightened to hold the collar 182 in the desired position relative to the support rod 76. Thus, the collar 182 and stop arm 180 capture the support rod 76 so that it has minimal horizontal movement relative to U-shaped rod support 67 without the stop arm 180 and collar 182 binding on the legs of rod support 67.

The sensing apparatus 81 can be used in the following applications. During the planting process, the farmer will use a planter which has a row marker assembly.

The purpose of the row marker assembly is to establish a mark or furrow 202 which is adjacent to and parallel to the rows which are being created by the planter. As shown in FIGS. 1 and 5, the furrow 202 normally has two sloping sides 204 and 206 which intersect to form a crotch, groove or channel 208. In addition, the mark or furrow should correspond to the center of the adjacent set of rows which will be planted. The farmer will then use this mark or furrow to plant the adjacent set of rows. Specifically, the farmer will align the tractor and implement with the furrow so that the center of the implement is aligned with the mark or furrow.

The row marker assembly consists of two marker arms which are pivotally attached to each side of the planter. A disk is attached to the distal end of each marker arm. The marker arms have an operational mode and a nonoperational mode. In the operational mode, the farmer lowers the marker arm which corresponds to the unplanted portion of the field and is adjacent to the planted rows. The disk engages the ground and creates a furrow in the field. In the nonoperational mode, the marker arm is raised and the disk does not engage the ground. After the farmer has completed one set of rows, the farmer will raise the marker arm to the nonoperational mode and turn the tractor and implement to begin the adjacent set of rows. The farmer then lowers the marker arm on the opposite side to the operational mode and begins to plant another set of rows.

When using the sensing apparatus 81, the farmer aligns the tractor and implement with the marker furrow and the sensing apparatus 81 will engage the marker furrow 202 as shown in FIG. 1. In order to position the sensing apparatus 81 in the marker furrow, the farmer should position the sensing apparatus 81 within a few inches of the marker furrow. As the tractor and implement progress through the field, the sensing apparatus 81 will move from side to side until it engages the marker furrow 202. The sensing apparatus 81 has an inherent tendency to locate the marker furrow due to the weight and flexible configuration of the sensing apparatus 81. In addition, the sensing apparatus has an inherent tendency to remain in the marker furrow due to the weight and flexible configuration of the sensing apparatus 81. Also, the sloping sides 204 and 206 of the marker furrow guide and maintain the sensing apparatus in the marker furrow. After the sensing apparatus 81 is positioned in the marker furrow 202, the farmer will activate the guidance system.

As the implement varies to the left or right of the marker furrow 202, the sensing apparatus 81 is displaced to the right or left. As previously described, this movement provides an electronic signal to the guidance controls. The guidance controls receive the signal and provide output for corrective action to the guidance indicator or a mechanism which affects lateral adjustment of the implement.

Figure 8:
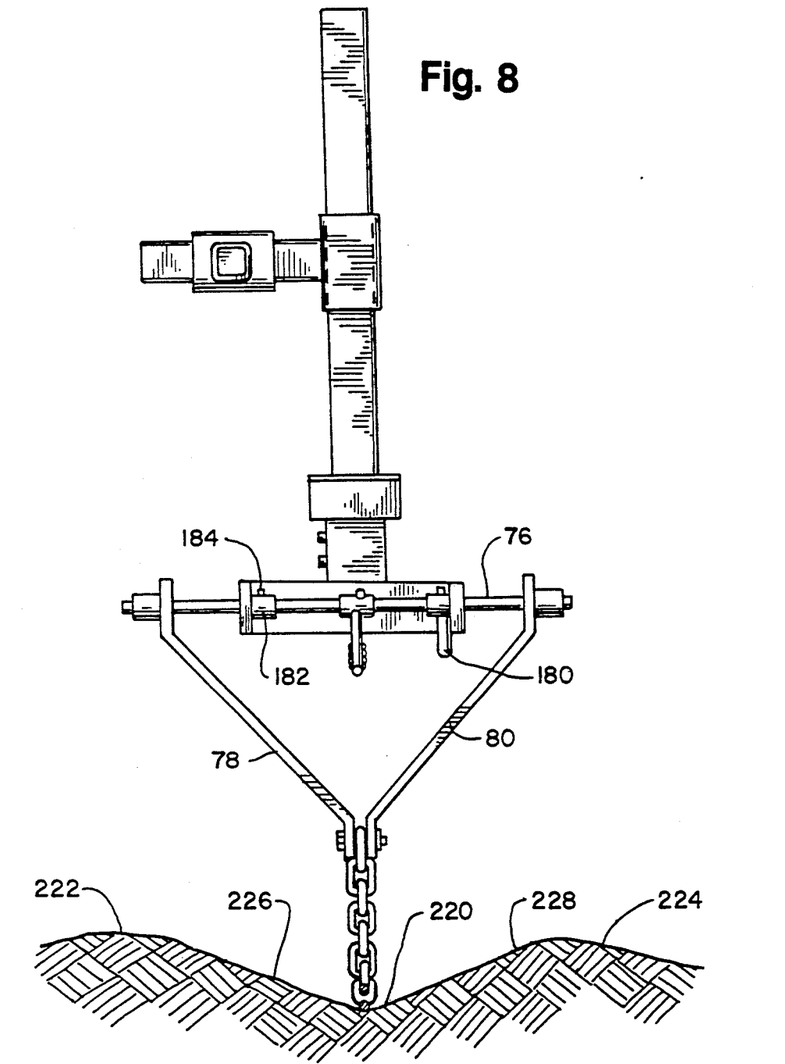
FIG. 8 is a rear elevational view of the position sensing assembly which shows the sensing apparatus engaging the valley between two ridges.

The sensing apparatus 81 can also be used for planting in ridge tillage fields. In ridge tillage farming, the farmer creates ridges in the field which usually correspond with the plant rows from the previous crop and the farmer plants the crop on these ridges. By using the sensing apparatus 81, the farmer can use the valley between the ridges to guide the planter during the planting process. Specifically, the farmer will align the tractor and implement with one of the valleys 220 so that the sensing apparatus 81 will engage the valley 220 between the ridges 222 and 224 as shown in FIG. 8. The farmer should position the sensing apparatus 81 between the two ridges 222 and 224. As the tractor and implement progress through the field, the sensing apparatus will seek the lowest point in the valley 220. The sensing apparatus has an inherent tendency to find the lowest point in the valley due to the weight and flexible configuration of the sensing apparatus. The sloping sides 226 and 228 between the ridges and the valley guide and maintain the sensing apparatus in the valley between the ridges.

After the sensing apparatus is positioned in the valley 220, the farmer will activate the guidance system. As the implement varies to the left or right relative to the valley 220, the sensing apparatus 81 is displaced to the left or right. As previously described, this movement provides an electronic signal to the guidance controls for lateral adjustment of the implement by a guidance mechanism or the farmer.

The sensing apparatus 81 can also be used with a cultivator to create evenly spaced ridges for ridge tillage farming. If a farmer wants to change from conventional farming to ridge tillage farming, the farmer may wish to establish uniformly spaced ridges throughout the field prior to planting on the ridges. By using the sensing apparatus 81 on the cultivator, the farmer can insure that each set of ridges which are created by the cultivator are parallel and uniformly spaced from the adjacent sets of ridges.

Specifically, the farmer attaches two position sensing assemblies 8 which include bracket assemblies 10 on each side and in front of the outermost gangs of the cultivator so that the sensing assemblies 8 extend forward and into the end or guess rows. These sensing assemblies are designated the left sensing assembly and the right sensing assembly and correspond with left and right hands of the farmer when the farmer is seated in the tractor. The control box has a switch which allows the farmer to activate either the left or right sensing assembly.

After the farmer has created the first set of ridges on one edge of the field, (e.g. the left edge of the field), the farmer will turn the tractor and implement to begin the adjacent second set of ridges. The farmer will be travelling parallel to the first set of ridges but in the opposite direction by which the farmer created the first set of ridges. The farmer aligns the sensing apparatus 81 on the right sensing assembly 8 with a valley between the first set of ridges so that the sensing apparatus 81 will engage the valley 220 between the ridges 222 and 224 as shown in FIG. 8.

After the sensing apparatus is positioned in the valley 220, the farmer activates the right sensing assembly 8 of the guidance system and proceeds through the field. As the implement varies to the left or right of the valley 220, the sensing apparatus 81 is displaced to the left or right. As previously described, this movement provides an electronic signal to the guidance controls for lateral adjustment of the implement by a guidance mechanism or the farmer.

After the farmer has reached the end of the field and completed the second set of ridges, the farmer will deactivate right sensing assembly 8 and turn the tractor and implement to begin the adjacent third set of ridges. The farmer will be traveling parallel to the second set of ridges but in the opposite direction by which the farmer created the second set o ridges. The farmer aligns the sensing apparatus 81 on the left sensing assembly with a valley between the second set of ridges so that the sensing apparatus will engage the valley. After the sensing apparatus is positioned in the valley, the farmer activates the left sensing assembly of the guidance system and proceeds through the field as previously described.

The sensing assembly is positioned on the cultivator to achieve a predetermined spacing between one set of ridges and the adjacent set of ridges. In most situations, this predetermined spacing will correspond to the distance from ridge to ridge in each set of ridges. Consequently, each ridge will be parallel to the other ridges and the spacing between the ridges will be uniform throughout the field.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A guidance system for a ground traversing implement comprising a position sensor mechanism which includes sensor means for mounting in a fixed position on said implement, an element for tracking ground reference indicia, means responsive to the lateral deviation in position of said tracking element relative to said sensor means for generating a correction signal, said tracking element having a first portion for contacting the ground for tracking purposes and a second portion extending upward from the lead end of said first portion to said position sensor mechanism, said first portion comprising the entire ground contacting and tracking portion of said tracking element and consisting entirely of an elongate member which is freely flexible to conform to the ground reference indicia and uniformly weighted throughout its length.

2. The invention as in claim 1 wherein said tracking element is a chain.

3. The invention as in claim 1 wherein said tracking element is a link chain.

4. The invention as in claim 1 wherein said element is attached directly to said sensor means and is of uniform construction throughout its length from said attachment to said sensor means to and throughout its ground-contacting length.

5. The invention as in claim 4 wherein said tracking element is a chain.

6. In a guidance system for a ground traversing implement comprising a position sensor mechanism which includes sensor means for mounting in a fixed position on said implement, an element for tracking ground reference indicia, means responsive to the lateral deviation in position of said tracking element relative to said sensor means for generating a correction signal, the improvement wherein said tracking element having a first portion for contacting the ground for tracking purposes and a second portion extending upward from the lead end of said first portion to said position sensor mechanism, said first portion comprising the entire ground contacting and tracking portion of said tracking element and consisting entirely of an elongate member which is freely flexible to conform to the ground reference indicia and uniformly weighted throughout its length.

7. The invention as in claim 6 wherein said tracking element is a chain.

8. The invention as in claim 6 wherein said tracking element is a link chain.

9. The invention as in claim 6 wherein said element is attached directly to said sensor means and is of uniform construction throughout its length from said attachment to said sensor means to and throughout its ground contacting length.

10. The invention as in claim 9 wherein said tracking element is a chain.

11. A guidance system for an agricultural implement comprising a position sensor mechanism which includes means for mounting said sensor mechanism to said implement, an element for tracking ground reference indicia means responsive to the lateral deviation in position of said tracking element relative to said sensor mechanism for generating a correction signal, said tracking element having a first portion for contacting the ground for tracking purposes and a second portion extending upward from the lead end of said first portion to said position sensor mechanism, said first portion comprising the entire ground contacting and tracking portion of said tracking element and consisting entirely of an elongate member which is freely flexible to conform to the ground reference indicia and uniformly weighted throughout its length.

12. The invention as in claim 11 wherein said position sensor mechanism includes a pivoting means for allowing relative horizontal movement between said tracking element and portions of said sensor mechanism which are mounted to said implement.

13. The invention as in claim 11 wherein said tracking element is a chain.

14. The invention as in claim 11 wherein said tracking element is a link chain.

15. The invention as in claim 11 wherein said element is attached directly to said sensor mechanism and is of uniform construction throughout its length from said attachment to said sensor mechanism to and throughout its ground-contacting length.

16. The invention as in claim 15 wherein said tracking element is a chain.

17. A guidance system for a ground traversing implement comprising a position sensor mechanism which includes sensor means for mounting in a fixed position on said implement, an element for tracking ground reference indicia and which has a portion for contacting the ground, means responsive to the lateral deviation in position of said tracking element relative to said sensor means for generating a correction signal, said tracking element is a chain which is attached directly to said sensor means and is of uniform construction throughout its length from said attachment to said sensor means to and throughout the portion which contacts the ground.

18. In a guidance system for a ground traversing implement comprising a position sensor mechanism which includes sensor means for mounting in a fixed position on said implement, an element for tracking ground reference indicia and which has a portion for contacting the ground, means responsive to the lateral deviation in position of said tracking element relative to said sensor means for generating a correction signal, the improvement wherein said tracking element is a chain which is attached directly to said sensor means and is of uniform construction throughout its length from said attachment to said sensor means to and throughout the portion which contacts the ground.

19. A guidance system for an agricultural implement comprising a position sensor mechanism which includes means for mounting said sensor mechanism to said implement, an element for tracking ground reference indicia which has a portion for contacting the ground, means responsive to the lateral deviation in position of said tracking element relative to said sensor mechanism for generating a correction signal, said tracking element is a chain which is attached directly to said sensor means and is of uniform construction throughout its length from said attachment to said sensor means to and throughout the portion which contacts the ground.

* * * * *